United States Patent
Gaubert

(10) Patent No.: US 12,430,968 B2
(45) Date of Patent: Sep. 30, 2025

(54) CONNECTED LOCK SYSTEM

(71) Applicant: FRIGG HOME SLLC, Blagoevgrad (BG)

(72) Inventor: Bernard Gaubert, Soustons (FR)

(73) Assignee: FRIGG HOME SLLC, Blagoevgrad (BG)

( * ) Notice: Subject to any disclaimer, the term of this patent is extended or adjusted under 35 U.S.C. 154(b) by 81 days.

(21) Appl. No.: 17/999,108

(22) PCT Filed: May 20, 2021

(86) PCT No.: PCT/FR2021/050909
§ 371 (c)(1),
(2) Date: Nov. 17, 2022

(87) PCT Pub. No.: WO2021/234307
PCT Pub. Date: Nov. 25, 2021

(65) Prior Publication Data
US 2023/0186701 A1    Jun. 15, 2023

(30) Foreign Application Priority Data

May 20, 2020   (FR) ...................................... 2005372

(51) Int. Cl.
*G07C 9/00* (2020.01)
(52) U.S. Cl.
CPC ..... *G07C 9/00571* (2013.01); *G07C 9/00817* (2013.01); *G07C 2009/00825* (2013.01)
(58) Field of Classification Search
CPC .... G07C 9/00; G07C 9/0057; G07C 9/00817; G07C 9/0069; G07C 9/10; G07C 9/15; G07C 9/20; G07C 9/21; G07C 2009/00579; G07C 2009/00587; G07C 2009/00595; G07C 2009/00809; G07C 2009/00952; G07C 5/00; G07C 5/0875; G07C 5/0891;
(Continued)

(56) References Cited

U.S. PATENT DOCUMENTS

2014/0265359 A1\* 9/2014 Cheng ..................... E05B 47/00
                                                          292/144
2017/0332055 A1   11/2017 Henderson
(Continued)

FOREIGN PATENT DOCUMENTS

CN    105100187 A     11/2015
CN    207177577 U      4/2018
CN    108979338 A  * 12/2018 ........... E05B 17/147
(Continued)

OTHER PUBLICATIONS

Japanese Office Action of related application JP 2022-571192, dated Jan. 28, 2025, including translation. [15 pages].

*Primary Examiner* — Nathan Cumar
(74) *Attorney, Agent, or Firm* — LEASON ELLIS LLP

(57) ABSTRACT

The invention relates to a connected lock system (1) for a door in the form of a housing, comprising at least one secure unlocking means (4, 5) connected to a door lock (2), a camera (6) and a detector (7) connected to the camera (6), a module for connection to an access management application, a communication module comprising a microphone (8) and a loudspeaker (9) that can be connected to the camera (6).
The invention further relates to a kit, a method and a corresponding assembly.

38 Claims, 1 Drawing Sheet

(58) Field of Classification Search
CPC ............ G07C 2209/00; G07C 2209/02; G07C 2209/04; E05B 47/00; E05B 2047/0067
USPC .......................................................... 70/285
See application file for complete search history.

(56) References Cited

U.S. PATENT DOCUMENTS

2018/0108192 A1* 4/2018 Ho .......................... G07C 9/253
2019/0178003 A1* 6/2019 Martin .................... E05B 15/02

FOREIGN PATENT DOCUMENTS

| CN | 110533807 A * | 12/2019 | ......... H04L 63/0807 |
|----|---------------|---------|------------------------|
| EP | 0924655 A2 | 6/1999 | |
| EP | 3366872 A1 * | 8/2018 | ......... E05B 15/0033 |
| EP | 3505710 A1 * | 7/2019 | ........... E05B 13/005 |
| FR | 3048714 A1 | 9/2017 | |
| FR | 3049635 A1 * | 10/2017 | ......... A47G 29/1201 |
| JP | H05324656 A | 12/1993 | |
| JP | H11280317 A | 10/1999 | |
| JP | 2010159594 A | 7/2010 | |
| JP | 2015226238 A | 12/2015 | |
| WO | 2016085529 A1 | 6/2016 | |
| WO | 2017117137 A1 | 7/2017 | |
| WO | WO-2018129915 A1 * | 7/2018 | |

* cited by examiner

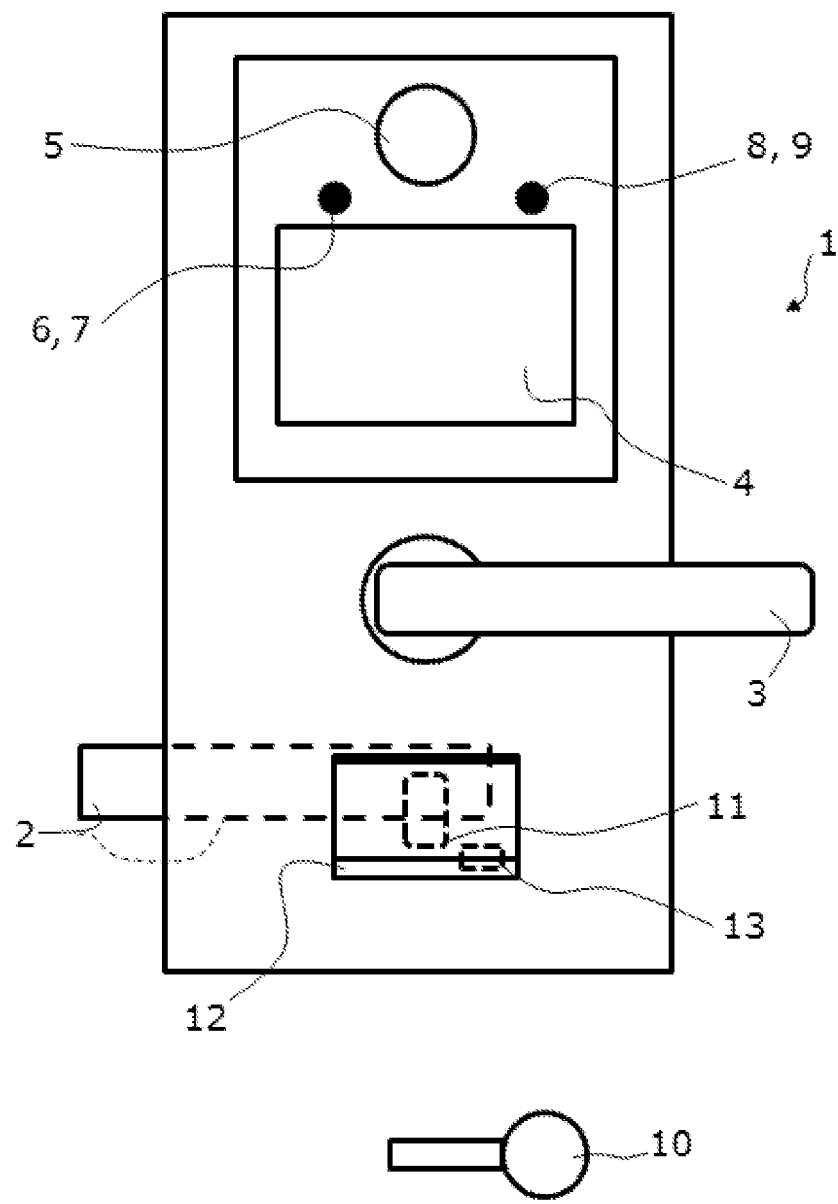

CONNECTED LOCK SYSTEM

CROSS-REFERENCE TO RELATED PATENT APPLICATIONS

This application is a U.S. National Stage Application under 35 U.S.C. § 371 of International Patent Application No. PCT/FR2021/050909 filed May 20, 2021, which claims the benefit of priority of French Patent Application No. 2005372 filed May 20, 2020, both of which are incorporated by reference in their entireties. The International Application was published on Nov. 25, 2021, as International Publication No. WO/2021/234307 A1.

The invention relates to the field of connected lock systems for doors, in particular for a front door of a dwelling (house, apartment, etc.) or other similar buildings or constructions.

In this domain, it is known to offer connected locks that cover the lock only and can be activated by a digital code or a telephone application.

Unfortunately, conventional connected locks in the prior art are not fully satisfactory when it comes to preventing blocking of the lock if the battery goes flat.

In addition, the connected locks in the prior art do not provide detailed information about which person is actually using the means of access.

Furthermore, the unlocking means of the connected lock have hacking flaws, meaning that a third party can hack into the internet connection or the unlocking signal and gain access to the controls of the lock.

US2014265359 describes a connected lock system for a door, said system comprising a housing and communicates with an access management application. However, the box has few communication features.

US2019178003 describes another connected lock system for a door, said system comprising a housing and communicates with an access management application. The housing has a cylindrical shape and is very compact, which limits the number of functions that can be integrated in the lock system.

Thus, a first object of the invention is to propose a connected lock system having means for preventing blocking of the lock if the battery of the system goes flat.

A second object is to propose a connected lock system that provides information about who is actually using the means of access.

A third object is to propose a connected lock system that is more secure against hacking of the means of access.

To achieve these objects, the invention proposes a connected lock system for a door, said system being configured as a housing, said housing comprising at least:
- a secure unlocking means suitable for being connected to a door lock,
- a camera configured to interact with a user;
- a detector connected to the camera and configured to detect a presence;
- a module for connection to an access management application;
- a communication module comprising a microphone and a loudspeaker configured to interact with the user.

According to one aspect, the system comprises a physical emergency key and an emergency lock on the housing, for unlocking the lock from the outside using the emergency key. Advantageously, this allows the lock to be opened from the outside even if the electronics of the system are not working.

According to another aspect, the system comprises, on the outside, a USB port for charging the system, preferably behind a concealing flap. Advantageously, this makes it possible to charge the system from the outside and not to be blocked by the lock.

According to another aspect, at least one secure unlocking means comprises an unlocking control for the lock, said unlocking control being able to be managed by one or more IoT communication protocols selected from NB-IoT, Li-Fi, UNB (Ultra-Narrow Band) and a mixed dual frequency (twin band) protocol. Advantageously, these protocols allow remote unlocking and, for the time being, are substantially impossible to breach. In addition, these protocols consume little electrical energy.

According to other aspects taken in isolation or combined in any technically feasible combination:
- the housing extends as a frame around the lock and an associated door handle; and/or
- the housing has a flat profile suitable for being installed against an exterior face of the door; and/or
- the detector is configured to trigger the operation of the camera upon detection of a presence; and/or
- the system comprises a removable concealing flap that conceals the emergency lock; and/or
- the secure unlocking means comprises a fingerprint reader; and/or
- the secure unlocking means comprises a numeric keypad; and/or
- the secure unlocking means comprises a badge unlocking module; and/or
- the system is powered by a lithium-ion battery that can be charged by magnetic resonance; and/or
- the connection module is configured to be connected to the access management application via a server which integrates the operating program of the lock system; and/or
- the lock system is connected to a Blockchain network; and/or
- the lock system is connected to the Holochain network; and/or
- the system comprises an anti-rip-out security module, configured to issue an alert via the access management application; and/or
- the system comprises an anti-break-in security module, configured to issue an alert via the access management application.

Another object of the invention relates to a connected lock kit comprising:
- a connected lock system according to the invention,
- a server connected to the lock system via a wireless communication protocol,
- an access management application configured to control the lock system via the server.

The invention also relates to a method for implementing a connected lock system. The method comprises the following steps:
a) installing the lock system on a door lock;
b) connecting the lock system to a server via a wireless communication protocol;
c) connecting an access management application to the lock system via the server.

According to one particular embodiment, the lock system and the mobile application are connected via a Blockchain or Holochain network.

The invention also relates to a set of connected locks, comprising a plurality of lock systems as described above, each lock system being connected to a Blockchain or Holochain network. Each connected lock system 1 is a relay point in the network.

The invention will be explained in more detail by describing non-limiting embodiments and on the basis of the accompanying FIGURE [FIG. 1], which is a plan view of the outside of a connected lock system according to a preferred embodiment of the invention.

The invention relates to a connected lock system 1, in particular for a door of a building, dwelling or other similar construction, more particularly an entrance door.

The connected lock system 1 is implemented as a housing. In particular, the housing extends as a frame around a lock 2 and an associated door handle 3.

Advantageously, the housing can be configured as a rigid block that is difficult to break open. Preferably, the housing has a flat profile suitable for being installed against an exterior face of the door.

The lock system 1 further comprises secure unlocking means that are mechanically connected to the door lock 2. Said means are a means of access control for operating the lock 2.

In particular, the secure unlocking means can comprise a fingerprint reader 4 and/or a numeric keypad 5. Thus, unlocking can be achieved by a numeric code via the numeric keypad 5 of the lock system 1 or by reading a fingerprint on the reader 4.

Other unlocking means can be considered. Preferably, said means can also be used for locking.

In a preferred variant, the lock system 1 is configured so as to be able to be locked by lifting the handle 3 upwards. The lock system 1 can be unlocked from the inside via a button installed electrically or mechanically on the board of the lock system 1.

The lock system 1 comprises a module for connection to an access management application. Said application is a web application or a mobile application that can be loaded onto a device of the access manager, i.e. the owner of the system 1 or a remote operator.

The access management application can be installed on one or more devices of the owner of the system 1, such as a smartphone, watch, tablet, computer, etc.

The application can be used to remotely lock or unlock the lock system 1.

The connection module connects to the application via a wireless communication protocol, for example by Wi-Fi or a mobile data module. Said module can integrate hardware components for this purpose. Advantageously, the mobile data connection (3G, 4G, 5G, etc.) makes it possible to maintain a connection even if home internet cuts out (Wi-Fi).

The communication protocol can be selected automatically via the mobile application.

According to a preferred embodiment, the lock system 1 is coupled to a server. Both are controlled by the access management application installed on one or more of the devices of the manager of the system 1, such as a smartphone, watch, tablet, computer, etc.

The operating program of the lock system 1, which is its "brain", is located on the server. The operating principle is comparable to an alarm system, like the relationship between a break-in detector and the alarm control panel.

The lock system 1 is connected to the server via a wireless communication protocol, such as Wi-Fi. The server transmits the information from the lock system 1 to the management application via the installed network.

The application has to go through the server to communicate with the lock system 1; the procedure is the same in the other direction. This removes any distance-related or performance-related constraints in the communication between the lock and the application.

The installation (lock, server, application) can operate on a decentralized Blockchain (such as Filecoin, Storj, Sia, MaidSafe) or Holochain network, which is a new technology which makes it possible to advance towards a truly decentralized and ultra-powerful internet that is different from the internet (http) as it is known or from the Blockchain. The Holochain network has the advantage of consuming less energy and being more secure.

The invention can have two distinct applications:
The first one is specific to the operation of the lock for individuals.
The second one is only reserved for certain professional sectors, such as the post or other delivery services, emergency services (firemen, paramedics, etc.), police forces (national and local police forces, etc.), certain home assistance services (personal assistance, etc.). Each professional sector will have, on the management application, the specific features related to the core work thereof. All of this will be implemented in compliance with the standards defined by the competent authorities, such as the CNIL for France. For security reasons, said access application will not be available for download on the web (http).

According to one aspect of the invention, the secure unlocking means can comprise an unlocking control for the lock, said locking control being able to be managed by one or more IoT communication protocols selected from M2M (machine to machine), NB-IoT, Li-Fi, UNB (Ultra-Narrow Band) and a mixed dual frequency (twin band) protocol. Thus, the unlocking command is supplied to the system by one or more of these protocols. Necessary components are provided in the housing for this purpose. Advantageously, these protocols allow remote unlocking and, for the time being, are substantially impossible to breach. Twin band is an additional security measure in its communication mode. Depending on a possible congestion of a frequency, twin band will allow the other frequency to supply the information more quickly.

In addition, UNB technology (Ultra-Narrow Band) uses unlicensed frequency bands (radio wave) available worldwide as the ISM band (industrial, scientific and medical band); for example, in Europe, ISL is at 868 Mhz. This frequency is ultra-fast and long-range radio.

The lock system 1 according to one variant is equipped with this technology in 433 Mhz/868 Mhz/902 Mhz or twin band mixed dual frequency protocol mode. This variant is very secure and efficient in case of channel congestion. Moreover, this technology installed on the lock system 1 will allow said system to be always functional in case of power, internet cut-outs, etc.

The communication protocol can be chosen on the basis of the geographical location where the lock system 1 is installed.

The secure unlocking means can further comprise a badge unlocking module. Thus, a badge reader (not shown) can be provided on the housing for this purpose.

Preferably, the lock system 1 can be connected to multiple devices within the same home network, or even all of them, using the same radio wave transmission protocol.

Preferably, the application includes a function indicating the charge level of the batteries of the lock system 1.

In one variant, for security purposes, if the batteries are low on charge and the lock is in the unlocked position, the lock locks automatically.

To unlock the lock system 1, if locked, several options are available: charging the batteries/changing the batteries from the inside, unlocking the system mechanically from the inside or via an emergency key, as detailed below.

According to one variant, the lock system 1 can be powered by a lithium-ion battery that can be charged by magnetic resonance.

The magnetic resonance charging device comprises a transmitter and a receiver (either an element connected to the battery to be charged, or the battery itself).

For example, the transmitter can be installed on an interior face of the door, and the receiver can be installed in the housing of the connected lock system 1, on the door side rather than on the outside, to reduce the distance between the transmitter and the receiver.

Alternatively, the transmitter can be installed on the server, which can be placed several meters away from the lock system 1.

Other arrangements of the transmitter and receiver are possible, without departing from the scope of the invention.

Preferably, a charge controller is integrated in the lock system 1 to continuously monitor the state of charge of the battery. The controller has a regulation function, which consists in ensuring the complete charging of the battery and preventing any risk of overcharging the battery by stopping the supply thereto when the battery reaches a predetermined level of charge. The controller cuts off the power supply to the generator when the state of charge of the battery reaches one of the limit values corresponding to the triggering of the safety feature. This permanent monitoring and protection makes it possible to significantly extend the performance and life of the battery.

Magnetic resonance allows the battery to be charged at great distances. This technique is based on a coil and a capacitor that acts as a resonator. Electrical energy is transmitted by electromagnetic resonance between the coil of the transmitter and that of the receiver. This process allows for longer charging distances. After all, the magnetic coupling between the two coils does not have to be strong, provided that the resonance frequencies of the two coils match. Thus, this technique gives more flexibility in the arrangement of the transmitter and the receiver.

In terms of frequencies, the electromagnetic waves (WPT: Wireless Power Transfer) will be in frequency bands below 30 MHz.

According to one aspect, in addition to the access control, the lock system 1 comprises a camera 6 and a detector 7 connected to the camera 6. The camera 6 is configured to capture images of the outside of the housing. The camera 6 can be fixed and directed in a single direction or can be oriented in different directions in relation to the housing. The detector 7 is configured to detect any presence in front of the entrance door, close to the housing.

Preferably, the camera 6 is a night-vision camera. Preferably, the detector 7 is also a night-vision detector.

According to one variant, the detector 7 is integrated in the camera 6.

Preferably, the detector 7 is configured to trigger the operation of the camera 6 when a presence is detected. This limits the power consumption of the camera 6.

Preferably, the detector 7 is configured to signal the detection of a presence via an audible alert, a vibration alert, etc., which is sent to at least one device of the owner (on a smartphone, a connected watch, a tablet, a computer, etc.) or of the operator, irrespective of the owner's or operator's location (work, vacation, on the couch, etc.) at a very long range.

According to the preferred variant, this feature is activated as soon as a presence is detected (minimum time stopped in front of the door, for example a time of two seconds) and in the case of a certain distance from the lock, for example less than one meter. For example, the person is seen in a close-up view.

Depending on the setting selected in the application by the owner, the person can be filmed, photographed, etc. and recorded on at least one device of the access manager, in particular the smartphone of the owner.

The lock system 1 further comprises a communication module comprising a microphone 8 and a loudspeaker 9. Advantageously, this makes it possible to interact with a third party wanting to enter by establishing communication with the access manager, i.e. the owner or an operator.

Preferably, the communication module can be used in association with the camera 6, making it possible to see said third party located in the vicinity of the housing.

Preferably, the communication module and the components thereof (microphone 8 and loudspeaker 9, and camera 6, if applicable) operate on Wi-Fi.

It is possible to communicate with this person and to unlock or lock the door remotely and from any location at a very long range. It may be necessary to have a mobile internet connection to allow the communication to work.

According to one variant, the system 1 comprises a physical emergency key 10 and an emergency lock 11 on the housing, for unlocking the lock 2 from the outside using the emergency key 10.

According to one variant, the system 1 comprises a removable concealing flap 12 that conceals the emergency lock 11. For example, the flap 12 can be slid or rotated vertically or horizontally. The emergency lock 11 is connected by a mechanical link to the same lock 2 as the connected lock. The emergency lock 11 is configured to be able to unlock the lock 2 when the connected lock fails. For example, the insertion of the emergency key 10 uncouples the cylinder from the actuation means of the lock 2 or said means are not coupled to the lock 2 in the standard situation. Advantageously, the emergency lock 11 allows the lock 2 to be unlocked even if the connected lock is not working or is out of charge.

The concealing flap 12 is provided with a push catch, comprising a spring with a magnet. The opening and closing are carried out by applying pressure. Behind the concealing flap 12, there is preferably a positioning sensor, which makes it possible, via the access management application installed on at least one device of the access manager, to know the status of the concealing flap 12 and to receive an alert if said flap is opened.

According to one variant, the system 1 comprises a USB port 13 for charging the system. This USB port 13 is connected to the electronics of the connected lock system. This port 13 is arranged on the outside, for example the outside of the building, dwelling, etc. The USB port 13 is preferably arranged behind the concealing flap 12. Advantageously, the concealing flap 12 makes it possible to protect the USB port 13 from dust and moisture. The same applies to the emergency lock 11.

According to one variant, the system comprises an anti-rip-out security module, configured to issue an alert via the access management application. In particular, said module is an electronic system for detecting a rip out, for example by detecting the separation of two parts of the housing, and transmits a notification about the rip out to the access manager via the access management application.

According to one variant, the system comprises an anti-break-in security module, configured to issue an alert to the access management application. In particular, said module is an electronic system for detecting a break-in, for example by means of drilling detection, and transmitting a notification about the break-in to the access manager via the access management application.

In particular, the lock system 1 in "locked" mode activates the rip-out and vibration detection security systems both on the corresponding door and on the lock system 1 (attempted drilling of the lock, unhinging of the door, etc.).

During use, a third party triggers the motion detector 7 of the camera 6, and an alert is issued in the application. If this third party has obstructed the camera 6 and is trying to break open the door, the lock system 1, etc., a specific second alert is sent via the application. This signal transmission is performed by radio waves via the most appropriate channel. Thus, a power or internet failure will not prevent the transmission of alerts.

Another object of the invention relates to a connected lock kit comprising:
- a lock system 1 as described above
- a server connected to the lock system 1 via a wireless communication protocol, for example Wi-Fi;
- an access management application configured to control the lock system 1 via the server.

Optionally, the kit can also include an access badge.

According to one particular embodiment, the lock system 1 can be connected to the Holochain network. Each connected lock system 1 is a relay point in the Holochain network.

Traditional centralized architectures are easy to understand, maintain and secure, but they create central points of failure.

The Holochain network turns the architecture of applications inside-out—users are at the center of their online presence, in charge of their own identity, data, and processing.

In a Holochain application, processing, storage and the security surface area are distributed throughout the network. This reduces central points of failure, bottlenecks, and attractive attack targets.

The two pillars of application integrity are intrinsic data integrity and peer replication/validation.

The Holochain network does not have a single global database; data comes from many individual sources.

Each user of an application also participates in building the application's infrastructure, supplying their own computer and storage resources and taking responsibility for validating and storing a small portion of other users' data.

The whole is greater than the sum of its parts—many agents, playing by simple rules, combine to form a social organism that maintains its own health.

Once the Holochain network is operational, the access management application is configured to perform an update, allowing the lock system 1 to operate on the Holochain network, which has many advantages: more secure, faster, less power-hungry, reduced black spot compared to current networks. The update will be carried out automatically between the application and the connected lock system 1. A private network between the lock system 1 and the application will be created, and a unique cryptographic key will be assigned to this private network. The application and the lock system 1 will be paired ("peer-to-peer"). This cryptographic key can be transmitted to third parties.

The connected lock system 1 operating on the Holochain network will serve as a relay in the network in the same way as the Holoport, as smartphone, watch, tablet and computer devices, and this will allow the owner of the lock to be paid in Holochain network cryptocurrency (return on investment).

Advantageously, a bandwidth usage monitoring and management tool can be installed on the server in order to prioritize the bandwidth of the private network to support the connected lock system 1 and home applications.

This will make it possible to optimize the performance of the network (Holochain, IPFS, SafeNetwork, Storj, etc.) according to the choice of network and to increase cost effectiveness (points gained for the hosting of the network).

The access management application of the lock system 1 can, via the server, control the opening of openings, for example a gate (for a house or a condominium), or the entrance door of an apartment building if the apartment building is equipped with this connected lock.

The access management application can be configured to detect connected lock systems that are within a certain perimeter.

The application does not make it possible to directly control each lock; to do this, it is first necessary to request access from the owner of the lock. The owner will have the option of refusing the request or accepting the request temporarily or permanently.

This authorization may allow the lock (2) to be unlocked or may simply make it possible to "ring the doorbell" so that the owner unlocks the lock (2).

The invention claimed is:

1. A connected lock system for a door, said system being configured as a single housing, said single housing comprising at least:
   - a secure unlocking means suitable for being connected to a door lock;
   - a camera configured to interact with a user;
   - a detector connected to the camera and configured to detect a presence;
   - a connection module for connection to an access management application; and
   - a communication module comprising a microphone and a loudspeaker configured to interact with the user, wherein the system is connected to a Blockchain network.

2. The system according to claim 1, characterized in that the housing extends as a frame around the door lock and an associated door handle.

3. The system according to claim 1, characterized in that the housing has a flat profile suitable for being installed against an exterior face of the door.

4. The system according to claim 1, characterized by comprising a physical emergency key and an emergency lock on the housing, for unlocking the door lock from the outside using the emergency key.

5. The system according to claim 4, characterized by comprising a removable concealing flap that conceals the emergency lock.

6. The system according to claim 5, characterized by comprising, on the outside, a Universal Serial Bus (USB) port for charging the system, wherein the USB port is disposed behind the removable concealing flap.

7. The system according to claim 1, characterized in that the secure unlocking means comprises a fingerprint reader.

8. The system according to claim 1, characterized in that the secure unlocking means comprises a numeric keypad.

9. The system according to claim 1, characterized by being powered by a lithium-ion battery that can be charged by magnetic resonance.

10. The system according to claim 1, characterized in that the connection module is configured to be connected to the access management application via a server which integrates an operating program of the lock system.

11. The system according to claim 1, characterized in that the secure unlocking means comprises an unlocking control for the door lock, said unlocking control being able to be managed by one or more Internet of Things (IoT) communication protocols selected from NB-IoT, Li-Fi, Ultra-Narrow Band (UNB), and a mixed dual frequency (twin band) protocol.

12. The system according to claim 11, characterized in that at least one secure unlocking means comprises a badge unlocking module.

13. The system according to claim 1, characterized by comprising an anti-rip-out security module, configured to issue an alert via the access management application.

14. The system according to claim 1, characterized by comprising an anti-break-in security module, configured to issue an alert via the access management application.

15. A connected lock kit, comprising:
   the connected lock system according to claim 1,
   a server connected to the lock system via a wireless communication protocol, and
   the access management application configured to control the lock system via the server.

16. A method for implementing the connected lock system according to claim 1, the method comprising the following steps:
   a) installing the lock system on the door lock;
   b) connecting the lock system to a server via a wireless communication protocol; and
   c) connecting the access management application to the lock system via the server.

17. A set of connected locks, characterized by comprising a plurality of connected lock systems according to claim 1, each lock system being connected to the Blockchain network.

18. The system according to claim 1, wherein when the system is connected to the Blockchain network, a private network is created between the system and the access management application, and a unique cryptographic key is assigned to the private network.

19. The system according to claim 1, characterized in that the connection module is configured to be connected to the access management application via a server which integrates an operating program of the lock system, and in that a bandwidth usage monitoring and management tool is installed on the server in order to prioritize a bandwidth of a private network.

20. A connected lock system for a door, said system being configured as a housing, said housing comprising at least:
   a secure unlocking means suitable for being connected to a door lock;
   a camera configured to interact with a user;
   a detector connected to the camera and configured to detect a presence;
   a connection module for connection to an access management application; and
   a communication module comprising a microphone and a loudspeaker configured to interact with the user,
   wherein the system is connected to a Holochain network.

21. The system according to claim 20, characterized in that the housing extends as a frame around the door lock and an associated door handle.

22. The system according to claim 20, characterized in that the housing has a flat profile suitable for being installed against an exterior face of the door.

23. The system according to claim 20, characterized by comprising a physical emergency key and an emergency lock on the housing, for unlocking the door lock from the outside using the emergency key.

24. The system according to claim 23, characterized by comprising a removable concealing flap that conceals the emergency lock.

25. The system according to claim 24, characterized by comprising, on the outside, a Universal Serial Bus (USB) port for charging the system, wherein the USB port is disposed behind the removable concealing flap.

26. The system according to claim 20, characterized in that the secure unlocking means comprises a fingerprint reader.

27. The system according to claim 20, characterized in that the secure unlocking means comprises a numeric keypad.

28. The system according to claim 20, characterized by being powered by a lithium-ion battery that can be charged by magnetic resonance.

29. The system according to claim 20, characterized in that the connection module is configured to be connected to the access management application via a server which integrates an operating program of the lock system.

30. The system according to claim 20, characterized in that the secure unlocking means comprises an unlocking control for the door lock, said unlocking control being able to be managed by one or more Internet of Things (IoT) communication protocols selected from NB-IoT, Li-Fi, Ultra-Narrow Band (UNB), and a mixed dual frequency (twin band) protocol.

31. The system according to claim 30, characterized in that at least one secure unlocking means comprises a badge unlocking module.

32. The system according to claim 20, characterized by comprising an anti-rip-out security module, configured to issue an alert via the access management application.

33. The system according to claim 20, characterized by comprising an anti-break-in security module, configured to issue an alert via the access management application.

34. A connected lock kit, comprising:
   the connected lock system according to claim 20,
   a server connected to the lock system via a wireless communication protocol, and
   the access management application configured to control the lock system via the server.

35. A method for implementing the connected lock system according to claim 20, the method comprising the following steps:
   a) installing the lock system on the door lock;
   b) connecting the lock system to a server via a wireless communication protocol; and
   c) connecting the access management application to the lock system via the server.

36. A set of connected locks, characterized by comprising a plurality of connected lock systems according to claim 20, each lock system being connected to the Holochain network.

37. The system according to claim 20, wherein when the system is connected to the Holochain network, a private network is created between the system and the access management application, and a unique cryptographic key is assigned to the private network.

38. The system according to claim 20, characterized in that the connection module is configured to be connected to the access management application via a server which integrates an operating program of the lock system, and in that a bandwidth usage monitoring and management tool is installed on the server in order to prioritize a bandwidth of a private network.

* * * * *